US011240316B1

(12) United States Patent
Gracey et al.

(10) Patent No.: US 11,240,316 B1
(45) Date of Patent: *Feb. 1, 2022

(54) SYSTEMS AND METHODS FOR OPTIMIZING INFORMATION COLLABORATION

(71) Applicant: Wells Fargo Bank, N.A., San Francisco, CA (US)

(72) Inventors: Daniel Gracey, Lake Saint Louis, MO (US); Scott Welz, Kirkwood, MO (US); Tyua Larsen Fraser, Livermore, CA (US); Matthew J. Kaufman, St. Louis, MO (US); Gwendoria M. Salley, Rock Hill, SC (US); Mark Lee Tabor, St. Louis, MO (US); Jefferson Crew, Plano, TX (US); John C. Brenner, Chesterfield, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,905

(22) Filed: Oct. 5, 2020

Related U.S. Application Data

(63) Continuation of application No. 15/484,426, filed on Apr. 11, 2017, now Pat. No. 10,798,180.

(51) Int. Cl.
*H04L 29/08* (2006.01)
(52) U.S. Cl.
CPC ............ *H04L 67/141* (2013.01); *H04L 67/20* (2013.01); *H04L 67/22* (2013.01); *H04L 67/306* (2013.01)

(58) Field of Classification Search
CPC . H04L 65/1093; H04L 65/403; H04L 67/141; H04L 67/20; H04L 67/22; H04L 67/306
See application file for complete search history.

(56) References Cited

U.S. PATENT DOCUMENTS 6,671,805 B1    12/2003  Brown et al.
7,016,870 B1    3/2006   Jones et al.
(Continued)

FOREIGN PATENT DOCUMENTS

WO    WO-2011094734 A2    8/2011

OTHER PUBLICATIONS

U.S. Appl. No. 16/949,946, filed Nov. 20, 2020, Systems and Methods for Content Delivery.
(Continued)

*Primary Examiner* — Shean Tokuta
(74) *Attorney, Agent, or Firm* — Schwegman Lundberg & Woessner, P.A.

(57) ABSTRACT

A system includes at least one hardware processor and a memory storing instructions that, when executed by the at least one hardware processor, cause the at least one hardware processor to perform operations including receiving an initiation message associated with a collaboration event between a first user and a second user, the collaboration event is initiated by the first user, determining a target device from a pool of computing devices associated with the second user based on usage history of each computing device in the pool of computing devices, initiating a collaboration session with the second user via the target device, and presenting collaborative content to the second user via the target device during the collaboration session.

15 Claims, 6 Drawing Sheets

(56) References Cited

U.S. PATENT DOCUMENTS

| | | | |
|---|---|---|---|
| 7,055,094 | B2 | 5/2006 | Imielinski et al. |
| 7,319,881 | B2 | 1/2008 | Endo |
| 7,788,155 | B2 | 8/2010 | Jones et al. |
| 7,945,783 | B2 | 5/2011 | Kent et al. |
| 8,010,663 | B2 | 8/2011 | Firminger et al. |
| 8,122,020 | B1 | 2/2012 | Donsbach et al. |
| 8,150,617 | B2 | 4/2012 | Manber et al. |
| 8,185,463 | B1 | 5/2012 | Ball |
| 8,234,302 | B1 | 7/2012 | Goodwin et al. |
| 8,281,037 | B2 | 10/2012 | Julia et al. |
| 8,407,125 | B2 | 3/2013 | Jenson et al. |
| 8,635,519 | B2 | 1/2014 | Everingham et al. |
| 8,856,640 | B1* | 10/2014 | Barr ............... G06F 21/64 715/229 |
| 8,966,362 | B2 | 2/2015 | Smetters et al. |
| 8,978,079 | B2 | 3/2015 | Pfeffer et al. |
| 9,083,746 | B2 | 7/2015 | Hamid |
| 9,223,837 | B2 | 12/2015 | Djugash |
| 9,342,842 | B2 | 5/2016 | Sanghavi et al. |
| 10,089,072 | B2* | 10/2018 | Piersol ............. G06F 3/167 |
| 10,305,835 | B2* | 5/2019 | James ............. H04L 51/14 |
| 10,666,751 | B1 | 5/2020 | Price et al. |
| 10,798,180 | B1* | 10/2020 | Gracey ........... H04L 65/4015 |
| 10,848,578 | B1 | 11/2020 | Gracey et al. |
| 2004/0002972 | A1 | 1/2004 | Pather et al. |
| 2004/0161080 | A1* | 8/2004 | Digate ............. H04L 67/24 379/88.17 |
| 2004/0161090 | A1* | 8/2004 | Digate ............. H04M 3/567 379/202.01 |
| 2007/0112668 | A1 | 5/2007 | Celano et al. |
| 2008/0288862 | A1* | 11/2008 | Smetters ........... G06F 40/117 715/255 |
| 2009/0099921 | A1* | 4/2009 | Klein ............. G06Q 30/02 705/14.69 |
| 2009/0125359 | A1* | 5/2009 | Knapic ........... G06Q 10/06 705/7.23 |
| 2010/0183132 | A1 | 7/2010 | Satyavolu et al. |
| 2010/0332973 | A1* | 12/2010 | Kloiber ........... G06F 40/103 715/255 |
| 2011/0258049 | A1 | 10/2011 | Ramer et al. |
| 2012/0084248 | A1 | 4/2012 | Gavrilescu |
| 2012/0221944 | A1* | 8/2012 | Bloomfield ....... G06Q 10/10 715/255 |
| 2012/0290926 | A1 | 11/2012 | Kapadia et al. |
| 2012/0302258 | A1 | 11/2012 | Pai et al. |
| 2012/0304054 | A1* | 11/2012 | Orf ............... G16H 15/00 715/255 |
| 2013/0125017 | A1 | 5/2013 | Kaghazian |
| 2013/0290289 | A1* | 10/2013 | Yu ............... G06Q 30/02 707/706 |
| 2013/0325598 | A1 | 12/2013 | Shao et al. |
| 2013/0325952 | A1* | 12/2013 | Draznin ........... H04N 21/4126 709/204 |
| 2014/0032634 | A1* | 1/2014 | Pimmel ........... H04L 65/1069 709/203 |
| 2014/0040979 | A1* | 2/2014 | Barton ............. G06F 21/72 726/1 |
| 2014/0064471 | A1* | 3/2014 | Krishnan ......... H04M 3/567 379/202.01 |
| 2014/0114735 | A1 | 4/2014 | Isaacson et al. |
| 2014/0143831 | A1* | 5/2014 | Fieweger ........... G06F 21/64 726/3 |
| 2014/0164255 | A1* | 6/2014 | Daly ............. G06Q 50/188 705/80 |
| 2014/0280955 | A1* | 9/2014 | Stuntebeck ......... G06F 21/10 709/226 |
| 2014/0282102 | A1* | 9/2014 | Avrahami ......... H04L 65/1093 715/753 |
| 2014/0289134 | A1* | 9/2014 | Sutton ............. G06Q 40/08 705/300 |
| 2014/0330769 | A1 | 11/2014 | Nguyen et al. |
| 2014/0365586 | A1 | 12/2014 | Friborg, Jr. |
| 2014/0372429 | A1 | 12/2014 | Ziklik et al. |
| 2015/0032366 | A1 | 1/2015 | Man et al. |
| 2015/0046598 | A1* | 2/2015 | Andrews ........... H04L 65/1069 709/228 |
| 2015/0066978 | A1 | 3/2015 | Chakra et al. |
| 2015/0081763 | A1 | 3/2015 | Sipola et al. |
| 2015/0082212 | A1 | 3/2015 | Sharda |
| 2015/0127124 | A1* | 5/2015 | Kobayashi ......... B25J 9/1689 700/83 |
| 2015/0220649 | A1* | 8/2015 | Papa ............. G06Q 40/04 707/722 |
| 2015/0242063 | A1* | 8/2015 | Lindo ............. G06F 3/0481 715/753 |
| 2015/0242645 | A1 | 8/2015 | Burger et al. |
| 2015/0310188 | A1* | 10/2015 | Ford ............. H04L 63/0428 726/28 |
| 2015/0350356 | A1* | 12/2015 | Linn ............. H04W 52/0229 709/202 |
| 2015/0350814 | A1* | 12/2015 | Krochmal ......... G06F 9/542 455/41.2 |
| 2015/0370769 | A1* | 12/2015 | Pereira Filho ..... G06F 21/6209 726/28 |
| 2015/0373065 | A1* | 12/2015 | Holmquist ......... H04L 65/4084 715/753 |
| 2015/0378722 | A1* | 12/2015 | Zuniga-Hernandez ... G06F 8/70 717/103 |
| 2015/0379583 | A1 | 12/2015 | Balasubramanian et al. |
| 2015/0381535 | A1* | 12/2015 | Selinger ........... H04L 51/02 709/206 |
| 2016/0034160 | A1* | 2/2016 | Kaltner ........... G06F 3/04847 715/716 |
| 2016/0048696 | A1* | 2/2016 | Follis ............. G06F 21/6209 726/28 |
| 2016/0063850 | A1* | 3/2016 | Yang ............. H04M 19/04 340/539.22 |
| 2016/0142783 | A1 | 5/2016 | Bagga et al. |
| 2016/0335415 | A1* | 11/2016 | Jones ............. G06F 21/10 |
| 2016/0371689 | A1 | 12/2016 | Brown et al. |
| 2017/0011483 | A1* | 1/2017 | Gatenio ........... G06F 40/166 |
| 2017/0034227 | A1* | 2/2017 | Yang ............. H04L 65/4038 |
| 2017/0140285 | A1 | 5/2017 | Dotan-Cohen et al. |
| 2017/0195731 | A1 | 7/2017 | Girlando et al. |
| 2017/0220546 | A1* | 8/2017 | Codrington ......... G06F 3/0484 |
| 2017/0272505 | A1 | 9/2017 | Smith |
| 2017/0289737 | A1* | 10/2017 | Bataller ........... H04L 67/06 |
| 2017/0300634 | A1* | 10/2017 | Chiang ........... G16H 10/60 |
| 2017/0332140 | A1* | 11/2017 | Blake ............. H04H 60/56 |
| 2017/0344245 | A1* | 11/2017 | Kumar ........... G06Q 10/10 |
| 2017/0357495 | A1* | 12/2017 | Crane ............. G06F 9/451 |
| 2017/0374046 | A1 | 12/2017 | Narasimhan et al. |
| 2018/0018468 | A1* | 1/2018 | Williams ........... G06F 16/93 |
| 2018/0167342 | A1* | 6/2018 | Lewis ............. H04L 51/043 |
| 2018/0167349 | A1* | 6/2018 | James ............. H04L 67/306 |
| 2018/0176270 | A1* | 6/2018 | Griffin ........... G06Q 10/06314 |
| 2018/0196880 | A1* | 7/2018 | Carter ............. G06F 16/9535 |
| 2018/0204213 | A1* | 7/2018 | Zappier ........... H04L 63/10 |
| 2018/0227789 | A1* | 8/2018 | Kothapalli ......... H04L 67/30 |
| 2018/0254959 | A1* | 9/2018 | Mantyjarvi ........ H04L 41/22 |
| 2019/0050587 | A1* | 2/2019 | Dang ............. G06F 21/604 |
| 2019/0147367 | A1* | 5/2019 | Bellamy ........... G06N 20/00 706/12 |
| 2019/0273627 | A1* | 9/2019 | Whalin ........... G06Q 30/02 |
| 2020/0042624 | A1* | 2/2020 | Alroqaie ........... G06F 16/93 |
| 2021/0105149 | A1* | 4/2021 | Roedel ............. H04L 12/1895 |
| 2021/0224765 | A1* | 7/2021 | Siddique ........... G06Q 20/12 |

OTHER PUBLICATIONS

"U.S. Appl. No. 15/393,070, Corrected Notice of Allowability dated Feb. 18, 2020".

"U.S. Appl. No. 15/393,070, Final Office Action dated Jun. 11, 2019", 16 pgs.

"U.S. Appl. No. 15/393,070, Non Final Office Action dated Dec. 13, 2018", 12 pgs.

"U.S. Appl. No. 15/393,070, Notice of Allowance dated Jan. 17, 2020".

"U.S. Appl. No. 15/393,070, Response filed May 13, 2019 to Non Final Office Action dated Dec. 13, 2018", 8 pgs.

(56) References Cited

OTHER PUBLICATIONS

"U.S. Appl. No. 15/393,070, Response filed Nov. 11, 2019 to Final Office Action dated Jun. 11, 2019", 9 pgs.
"U.S. Appl. No. 15/484,419, Notice of Allowance dated Jul. 16, 2020".
"U.S. Appl. No. 16/882,058, Preliminary Amendment filed Sep. 9, 2020", 7 pgs.
"U.S. Appl. No. 15/484,419, Advisory Action dated Dec. 9, 2019", 3 pgs.
"U.S. Appl. No. 15/484,419, Final Office Action dated Jul. 29, 2019", 11 pgs.
"U.S. Appl. No. 15/484,419, Non Final Office Action dated Feb. 8, 2019".
"U.S. Appl. No. 15/484,419, Response filed May 8, 2019 to Non Final Office Action dated Feb. 8, 2019", 10 pgs.
"U.S. Appl. No. 15/484,419, Response filed Nov. 27, 2019 to Final Office Action dated Jul. 29, 2019", 11 pgs.
"U.S. Appl. No. 15/484,426, Final Office Action dated Jun. 27, 2019", 11 pgs.
"U.S. Appl. No. 15/484,426, Non Final Office Action dated Feb. 28, 2019", 11 pgs.
"U.S. Appl. No. 15/484,426, Notice of Allowance dated Jun. 4, 2020".
"U.S. Appl. No. 15/484,426, Response filed May 28, 2019 to Non Final Office Action dated Feb. 28, 2019", 10 pgs.
"U.S. Appl. No. 15/484,426, Response filed Nov. 26, 2019 to Final Office Action dated Jun. 27, 2019", 10 pgs.
Dimou, Anastasia, et al., "Mapping Hierarchical Sources into RDF using the RML Mapping Language", (May 20, 2015), 8 pgs.
"U.S. Appl. No. 16/949,946, Non Final Office Action dated Nov. 10, 2021", 19 pgs.

\* cited by examiner

SYSTEMS AND METHODS FOR OPTIMIZING INFORMATION COLLABORATION

CROSS-REFERENCE TO RELATED APPLICATION

This application is a continuation of U.S. patent application Ser. No. 15/484,426, filed Apr. 11, 2017, now issued as U.S. Pat. No. 10,798,180, which is incorporated by reference herein in its entirety.

TECHNICAL FIELD

Embodiments described herein generally relate to computing systems and, for example and without limitation, to software systems and methods for optimizing information collaboration between users.

BACKGROUND

As people conduct their daily lives, they may encounter content they wish to share with others. Some such situations may be prompted by processes in which multiple users are a party. For example, a customer may be opening an account with an institution and may wish to have their spouse associated with the account (e.g., as a co-member on the account, or as a beneficiary of the account). During such processes, both of the parties may have content to review, steps to perform, or documents to execute in order to complete the process. However, if both parties are not physically present together during certain stages in the process, the process may be delayed, or key information may not be shared in a timely manner with the parties, leading to marginalized collaboration.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
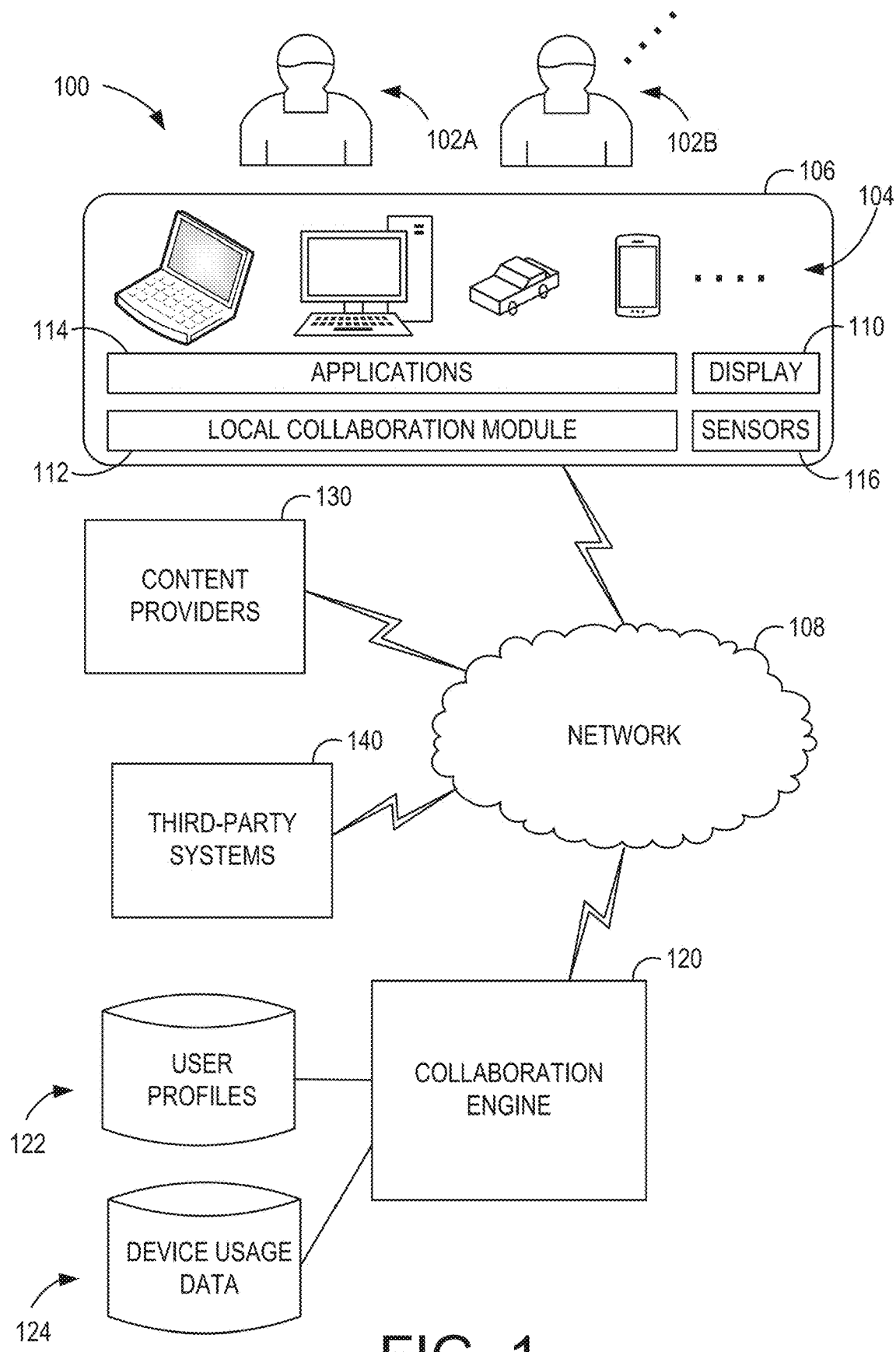
FIG. 1 illustrates an example networked environment including components of a collaboration system for providing various collaboration services to a primary user and one or more collaborative users.

The systems and methods described herein, for example, describe a technical solution for enhancing information collaboration between multiple people ("users"). People may experience several situations in their daily lives which may involve or benefit from information collaboration between themselves and others (e.g., their spouse, or a trusted advisor). For example, a person ("primary user") may be considering a change impacting their retirement plan (e.g., a change in an investment position, or consideration of a house purchase, or changes in a college savings plan). The primary user may wish to engage their spouse (a "collaborative user") before they make any changes to the plan. Further, some situations may include processes that necessarily involve multiple people. For example, a financial institution may provide a process requiring approval of multiple parties in a joint account.

A collaboration system is described herein that facilitates and enhances content collaboration through various technical methods. In an example embodiment, a primary user is presented with content (e.g., documents, media, voice chat, and so forth), and that primary user may prompt the collaboration system to engage a particular user (a collaborative user) to collaborate in regards to the content. For example, the primary user may be presented with a proposed change to their retirement plan (e.g., from their financial advisor), and they may wish to engage their spouse to review the proposed changes and potential impacts on their shared retirement plan. As such, the primary user may prompt the collaboration system to engage their spouse for collaboration with the content (e.g., reviewing a document, discussing ramifications of the proposal, receiving verbal approval to proceed or make changes).

In another example embodiment, the primary user may be engaged in a collaborative process which involves one or more other people. For example, the primary user may be opening an account with an institution, or performing a transaction involving execution of joint legal documents, and involvement of another person (e.g., their spouse) may be needed to complete certain stages of the process (e.g., reviewing and executing documents, providing approvals, and so forth). As such, the collaboration system may automatically, or via user prompting, engage the spouse during steps in which the spouse is needed.

When engaging the collaborative user, in an example embodiment, the collaboration system determines how best to reach the collaborative user. In some situations, time may be an important factor and, as such, reaching the collaborative user for their participation may be important. Accordingly, the collaboration system may determine a device with which the collaborative user currently has access, or a device and device venue that is capable of providing certain types of interactions with the collaborative user.

For example, presume the collaborative user is at their home at the time the primary user engages the collaboration. As such, the collaboration system may detect the location of the collaborative user (e.g., based on device activity within the home, or based on geolocation data of a device closely associated with the collaborative user), as well as a pool of available devices at that particular location. Some types of collaboration may utilize particular content formats (e.g., web-based or app-based interfaces, document execution applications), or leverage particular technologies (e.g., media players, media viewers, voice players, voice recognition). As such, based on the determined location of the collaborative user and the collaboration needs, the collaboration system may then determine which device ("target device"), from a pool of available devices at that location (e.g., smart TV, smart speaker device such as Amazon Echo® or Google Home®, home computer, tablet device, smart phone) is capable of providing the type of collaboration associated with the collaborative content, or the collaborative process. The target device provides a "target device venue" within that device that is capable of providing the proper collaborative interactions requested, such as an application or media player configured to present content to the user.

The term "primary user", as used herein, refers to the person initially presented with content to be shared, or the person instigating the information collaboration with another person. The term "collaborative user", as used herein, refers to the additional person(s) that are targeted for collaboration with the primary user or other collaborative users. In some example situations, a particular collaborative process may prompt engagement of multiple users (e.g., a primary user with one or more collaborative users, or multiple collaborative users together). It should be understood that, for some situations, there may be no significance as to which user is considered the primary user and which are collaborative users. The distinction is made herein at least to distinguish between the multiple users that are collaborating via the systems and methods described herein. The term "collaborating users" may be used to refer, collectively, to both the primary user and the collaborative users.

The terms "collaborative content" and "collaborative process", as used herein, may refer to the content over which the collaborating users engage, or the process in which the collaborating users engage, respectively.

FIG. 1 illustrates an example networked environment including components of a collaboration system 100 for providing various collaboration services to a primary user 102A and collaborative users 102B. Collectively, primary user 102A and collaborative users 102B may be referred to as collaborating users 102. In an example embodiment, the collaboration system 100 includes a collaboration engine 120 communicatively coupled to a pool 106 of one or more user computing devices 104 (e.g., smartphones, laptop or desktop personal computers, tablet devices, smart TVs, wearable computing devices, automobile computers, automobile radios, and so forth) via a network 108. The computing devices 104 may be owned by the collaborating user(s) 102, or are otherwise computing devices 104 with which the collaborating users 102 interact (e.g., regularly during their daily lives).

In an example embodiment, each of the computing devices 104 optionally includes a display device 110 (e.g., monitor, touch screen, head-mounted display), and optionally an audio device (not separately depicted), through which the user 102 consumes content. The computing devices 104 may include a local collaboration module 112, one or more software applications (or just "applications" or "apps") 114, and one or more sensors 116. The local collaboration module 112 may work in conjunction with the collaboration engine 120, for example, to present content to the user 102, or to otherwise allow aspects of collaboration between the primary user 102A and the collaborative user 102B. Applications 114 may include, for example, web browsers, software applications (e.g., mobile apps, third party applications), video or audio players, and so forth.

While there is only one display 110, local collaboration module 112, applications 114, and sensors 116 depicted in FIG. 1, it should be understood that each computing device 104 may have a subset of these components.

In an example embodiment, the user computing devices 104 may also be in communication with or otherwise include one or more sensors 116. Sensors 116 may include a global positioning system (GPS) receiver configured to determine a location of the collaborating user 102, or health/fitness sensors such as biometric sensors (e.g., tracking heart rate, number of steps, blood pressure, level of exercise, and so forth), or orientation sensors (e.g., in a head mounted display, to determine an orientation of a head of the user 102). Sensor data from sensors 116 may be used to detect certain aspects of collaboration by the user 102, as described in further detail below.

In an example embodiment, the collaboration engine 120 and the user computing devices 104 are communicatively coupled to the content providers 130 and the third-party systems 140 (e.g., wirelessly, or via wired connections). The primary user 102A may interact with the content providers 130 or the third-party systems 140 via the user computing devices 104 while viewing content with which they desire to collaborate, or while performing an online process in which they desire to collaborate. Third-party systems 140 may include, for example, banking institutions hosting bank accounts of the collaborating users 102, financial service providers that provide investment services to the collaborating users 102, social networks on which the collaborating user 102 has an account, financial lenders underwriting loans made to the user 102, payment card providers providing payment cards for the collaborating users 102, news sources, online merchants, or other service providers or other third parties with which the collaborating users 102 may access via the computing devices 104.

The collaboration engine 120 also includes user profiles 122 and device usage data 124. In the example embodiment, the user profiles 122 and the device usage data 124 are stored in a database, such as a configuration file or a relational database. The user profiles 122 include user information related to the user computing devices 104 of the collaborating users 102. For example, the collaboration system 100 may build and manage a user profile 122 for a particular user such as the collaborative user 102B, and that user profile 122 may include information such as the pool 106 of user computing devices 104 available to the collaborative user 102B, usage information indicating when the collaborative user 102B is using or tends to use each particular user computing device 104, and various types of device venues supported by each user computing device 104. The device usage data 124 includes current "in-use" data and historical use data associated with the user 102's use of their devices 104.

During operation, the collaboration system 100 facilitates collaboration between the primary user 102A and the secondary user(s) 102B. In one example embodiment, the primary user 102A accesses content via one of their user computing devices 104, and they determine that they wish to collaborate with the collaborative user 102B regarding that content, thereby making that content "collaborative content". In another example embodiment, the primary user 102A engages in a process, and the primary user 102A or the collaboration system 100 determines that the process involves the collaborative user 102B, thereby making the process a collaborative process. The collaboration system 100 facilitates various types of collaboration between the primary user 102A and the collaborative user 102B, as described herein.

Figure 2:
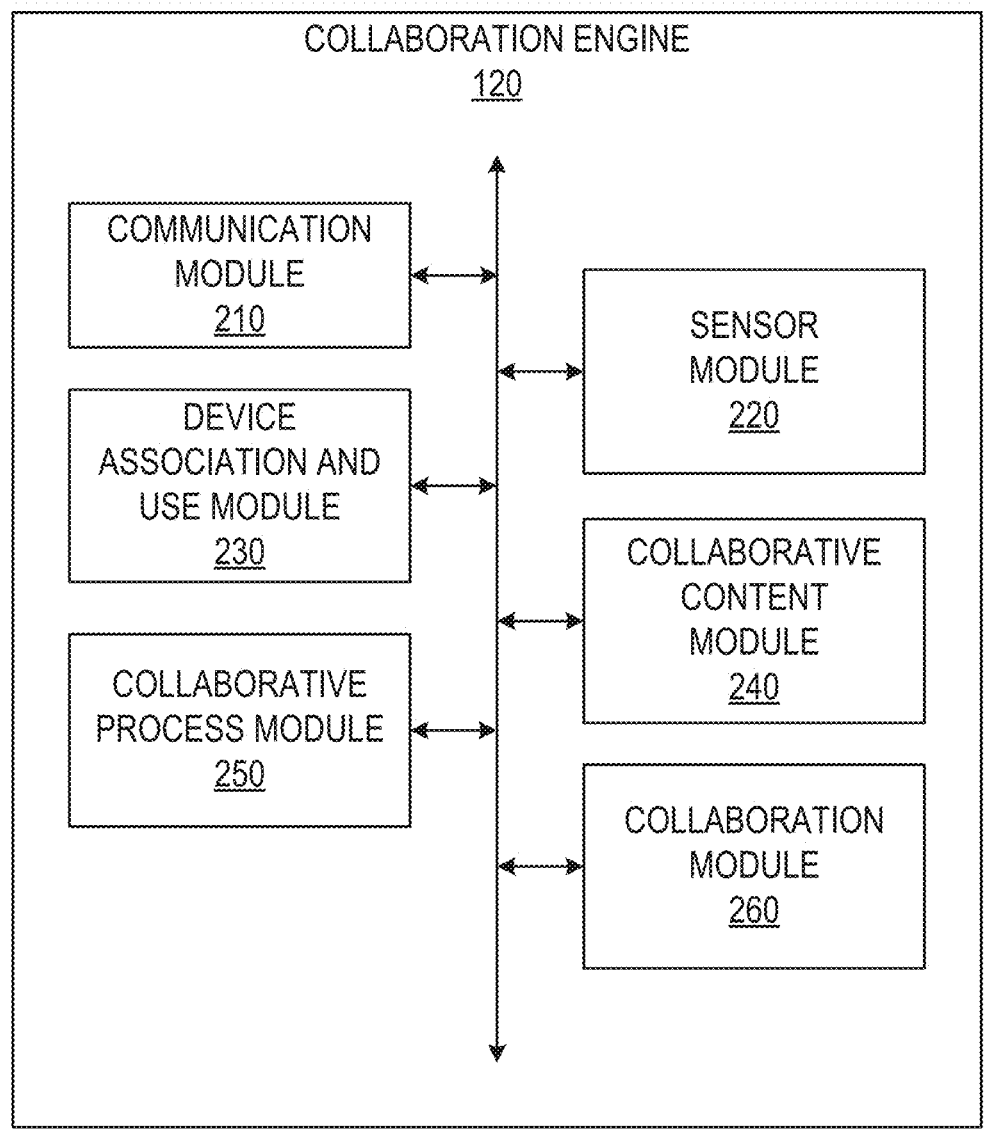
FIG. 2 is a block diagram showing components within the collaboration engine, according to some embodiments.

FIG. 2 is a block diagram showing components within the collaboration engine 120, according to some embodiments. The collaboration engine 120 may be hosted on dedicated or shared server machines (not shown) that are communicatively coupled to facilitate communications between the server machines. The components themselves may be communicatively coupled to each other and to various data sources, so as to allow information to be passed among the components or so as to allow the components to share and access common data. Furthermore, the components may access one or more databases (e.g., user profiles 122) via database servers (not separately shown). In the example embodiment, the collaboration engine 120 includes a communication module 210, a sensor module 220, a device association and use module 230, a collaborative content module 240, a collaborative process module 250, and a collaboration module 260. In some embodiments, the local collaboration module 112 may include or otherwise perform functionality similar to one or more of the modules 210, 220, 230, 240, 250, and 260.

The communication module 210, in an example embodiment, provides network communication functionality (e.g., by configuring a network interface card) between the collaboration engine 120 and other computing devices, such as the user computing device 104, the content providers 130, and the third-party systems 140. In some embodiments, the communication module 210 facilitates communication over the Internet (e.g., the network 108) or other Internet Protocol (IP) based networks (e.g., IEEE 802 standards). In some embodiments, the communication module 210 facilitates communication to devices over cellular networks (e.g., to smartphone or tablet devices over a 3G/4G network). In other embodiments, the communication module 210 allows the collaboration engine 120 to communicate over both IEEE 802 standard-based network and a cellular network at the same time (e.g., connects to the inquiring user computing device 104 over the cellular network and connects to third-party websites over the 802 network).

In an example embodiment, the sensor module 220 provides functionality associated with analysis of sensor data of the users 102 from the sensors 116. The sensor data may come from a variety of types of sensors, such as GPS receivers (e.g., providing location data associated with the user computing devices 104) and biometric sensors (e.g., health and fitness data of the user 102). The sensor module 220 may receive raw data values from the sensors 116, and may analyze these values in conjunction with particular aspects of collaboration.

The device association and use module 230 associates various computing devices 104 with the user 102 (e.g., as a part of the pool 106) and analyzes historical and current use of those devices 104 by the user 102. The device association module 230 may identify unique computing devices 104 using, for example, hardware processor serial number, mobile identification number (MIN) or mobile subscription identification number (MSIN), cookies, or IP address. In some embodiments, the user 102 may identify one or more computing devices 104 for association with the user 102 (e.g., through a device registration process with the collaboration engine 120). In some embodiments, the device association module 230 may automatically detect one or more computing device 104 used by the user 102. In some embodiments, the device association module 230 may receive device data from content providers 130 or third-party systems 140 identifying one or more computing devices 104 associated with the user 102. Each identified device may be added to the pool 106, thereby generating a set of computing devices 104 associated with the user 102.

For example, the pool 106 may include a home television and a home nest device registered by the user 102, and a particular smartphone identified as associated with the user 102 by a cellphone service provider, and the device association module 230 may detect that the user 102 uses a particular desktop computer (e.g., based on the user 102 having logged into a trusted third-party application from that particular desktop computer). Various methods of device association are described in greater detail below.

The collaborative content module 240, in an example embodiment, allows the primary user 102A to identify collaborative content for collaboration with the collaborative user 102B. For example, during operation, the primary user 102A may be an investor viewing a document, such as a research report associated with a particular investment security or a particular financial market. The primary user 102A may determine that they wish to collaborate with the collaborative user 102B (e.g., their financial advisor, their spouse, a trusted advisor) regarding the research report or portions thereof. The collaborative content module 240 allows the primary user 102A to identify the research report, or portions thereof, as collaborative content to be shared with the collaborative user 102B. For example, the primary user 102A may add highlighting to portions of the research report (e.g., identifying those portions as to be reviewed by the collaborative user 102B), or may add notes to the research report or portions thereof (e.g., providing their own thoughts or concerns for review by the collaborative user 102B).

The collaborative process module 250, in an example embodiment, allows the collaborative user 102B to be engaged in a collaborative process with the primary user 102A. In some embodiments, the collaborative content module 240 may automatically determine that the collaborative user 102B is a part of the collaborative process (e.g., as a necessary participant, such as a member of a joint account associated with the process). In other embodiments, the collaborative process module 250 may allow the primary user 102A to identify the collaborative user 102B as a part of the collaborative process (e.g., as a discretionary participant, such as when considering a large purchase that may impact a retirement plan shared between spouses).

The collaboration module 260, in an example embodiment, facilitates collaboration actions with the collaborative user 102B. In some embodiments, the collaboration module 260 automatically determines a "target device" from the pool 106 of user computing devices 104 associated with the collaborative user 102B through which to attempt collaborative actions. For example, the collaboration module 260 may evaluate current or recent uses of the various devices 104 to determine which device(s) 104 the collaborative user 102B has most recently used, or which device(s) the collaborative user 102B is currently using. As such, the collaboration module 260 may select one or more of these devices as the target device(s). In other embodiments, the primary user 102A may select the target device for the collaboration (e.g., selecting their spouse's smart phone as the target device).

In some embodiments, the collaboration module 260 may determine a target device venue through which to engage the collaborative user 102B. For example, the collaboration module 260 may analyze the current or recent usage of various device venues by the collaborative user 102B, such as an email reader, or a social networking application, or a web browser, or a third-party application. The collaboration module 260 may select a recently used device venue as the target device venue in order to, for example, reach the collaborative user 1029 more quickly in a device venue currently or frequently used.

In some embodiments, the collaboration module 260 may determine the target device or target device venue, for example, based on the type of collaborative content or the collaborative process, or a particular device venue associated with the collaborative content or process. Some devices 104 may not be capable of, or may be less efficient at, presenting certain types of collaborative content. For example, a home nest device or a car stereo may provide only audio output and, as such, may not be suitable for sharing a marked-up document. Further, some devices 104 may not provide a device venue capable of allowing the collaborative user 1029 to engage with the collaborative process. For example, the collaboration process may provide a step in which the collaborative user 102B reviews and digitally signs a document through an application 114, and that application 114 may be installed on some devices 104 in the pool 106 but not others. As such, the collaboration module 260 may limit determination of the target device based on the collaborative content or process, or the device venues supported by the various devices 104.

In an example embodiment, the collaboration module 260 attempts to engage the collaborative user 1029 for collaboration via the target device and target device venue through one or more contact initiation actions. For example, the collaboration module 260 may attempt to contact the collaborative user 102B for collaboration on the target device by sending an alert message to the target device (e.g., a menu alert on a smart phone of the user 102B, an audible alert on a nest device of the user 102B), or by sending a social media message to a social media account of the collaborative user 102B, or by sending an email to the collaborative user 102B, or by automatically executing a third-party application on the target device, or by sending a text to a smart phone of the collaborative user 102B, or through voice chat device venues (e.g., via a nest device), or by opening a channel of direct communication with the user 1029 (e.g., cell phone call, video-based session, and so forth).

Once the collaborative user 102B has been reached via one of the contact initiation actions, the collaboration module 260 provides collaboration actions associated with the collaborative content or process. In the case of collaborative content, the collaboration module 260 may present the collaborative content to the user 102B via an appropriate device venue. For example, a document may be presented to the user 102B through a document editor or viewer, thereby allowing the user 102B to read the document, any portions identified by the primary user 102A, and any notes added by the primary user 102A. In another example, an audio-based content item may be audibly presented to the user 102B.

In the case of a collaborative process, the collaboration module 260 may initiate a step in which the user 102B is to participate. For example, the collaborative process may include review and execution of a legal document, or approval of a third-party recommendation or action (e.g., a financial trade, a purchase, an account opening, a change in a portfolio or retirement plan). As such, the collaboration module 260 may initiate an application 114 on the target device in which the user 102B may complete such a collaborative step (e.g., a digital document execution application, a voice interaction application). For example, the collaboration module 260 may execute an electronic signature application on the target device and load a particular legal document for review and execution by the user 102B.

In some embodiments, the collaboration engine 120 may operate in conjunction with the local collaboration module 112 to facilitate collaborative actions described herein. For example, the collaboration engine 120 may initiate review of the collaborative content, or a step in a collaborative process, by transmitting commands, content, and so forth, to the local collaboration module 112 on the target device, thereby causing the target device to present the collaborative content or the collaborative step on the target device and within the target device venue.

Figure 3:
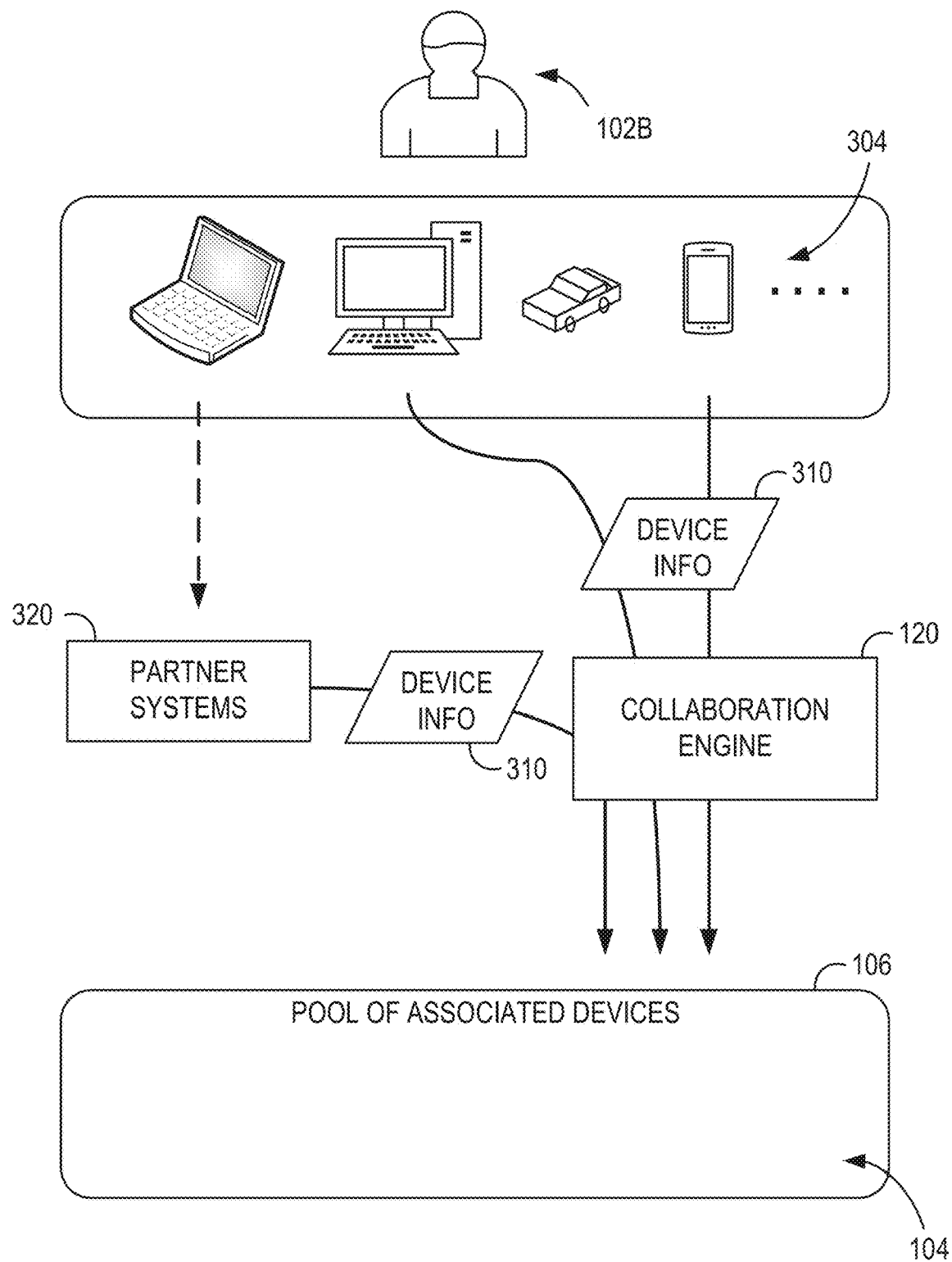
FIG. 3 is a workflow diagram depicting device association as performed by the collaboration engine, according to some embodiments.

FIG. 3 is a workflow diagram depicting device association as performed by the collaboration engine 120, according to some embodiments. In an example embodiment, the collaborative user 102B uses multiple computing devices 304 during their daily lives. These devices 304 may be similar to the user computing devices 104, and may be varied in the type of device, as mentioned above with respect to FIG. 1. Initially, when the collaborative user 102B is new to the collaboration system 100, the collaboration system 100 may not yet associate any of the computing devices 304 with the collaborative user 102B (e.g., they may be "unassociated devices"). Through various association and discovery steps described herein, the collaboration engine 120 receives device information 310 about the unassociated computing devices 304 and associates those devices 304 with the collaborative user 102B to create the user pool 106 of associated devices 104. Once associated with the collaborative user 102B, the collaboration engine 120 may use the associated devices 104 to evaluate content consumption patterns of the user 102B and deliver relevant content to the user 102B when the user 102B prefers, and via the device 304 and forum on which the user 102 prefers.

The collaboration engine 120 may use various methods of associating the computing devices 304 with the collaborative user 102B. In one example embodiment, the user 102 self-identifies a computing device 304 with the collaboration engine 120. For example, the collaboration engine 120 may present a configuration interface (not separately depicted) to the user 102B, allowing the user 102B to register devices 304 with the collaboration system 100 (e.g., via CPU serial number, IP address, mobile phone number, manufacturer serial number, and so forth). In some embodiments, this configuration interface may allow the user 102B to install the local collaboration module 112 onto the device 304. The local collaboration module 112 may then register the device 304 with the collaboration engine 120, thereby associating the device 304 with the user 102B and adding that device 304 to the pool 106 as an "associated device 104". The local collaboration module 112 may transmit, to the collaboration engine 120, a user ID for the collaborative user 102B ("collaborative user ID") and a device ID associated with the device 304. The collaboration system 100 may use a fixed identifier associated with the device 304 (e.g., a CPU serial number), or may generate a unique identifier for the device 304 (e.g., a custom device ID).

In some embodiments, the collaboration engine 120 may automatically detect an association between a device 304 and the collaborative user 102B. For example, the user 102B may log into the collaboration system 100 or into a partner system 320 (e.g., a content provider 130, a third-party system 140) from an unassociated device 304. At such time, the user 102B may identify themselves to that partner system 320, for example, through a user ID of the user 102B on that partner system 320 ("partner system user ID"). The partner system 320 may collect device information 310 from the unassociated device 304 and transmit the device information 310 to the collaboration engine 120 along with user information identifying the user 102B. In some embodiments, one of the collaboration engine 120 and the partner system 320 may perform a mapping between a partner system user ID of the user 102B and a collaborative user ID of the user 102B, thereby uniquely identifying the user 102B to the collaboration engine 120.

In some embodiments, device information 310 may include data such as a hardware identifier (e.g., a CPU serial number, a device serial number, a custom device ID), communications information (e.g., device IP address, cellular telephone number), hardware information (e.g., device manufacturer, device type, model, firmware version), and software information (e.g., operating system version, installed applications 114, content consumption device venues).

In some embodiments, the collaboration engine 120 may associate a device 304 with the collaborative user 102B based on network proximity. For example, presume a first device 104 of the user 102 (e.g., a smartphone) has been previously associated with the user 102B, and a second device 304 of the user 102 (e.g., a laptop computer) is not yet associated with the user 102B. Also presume that both devices 104, 304 include Wi-Fi network adapters linked to a shared Wi-Fi or network router in a personal local area network (LAN) (not separately depicted). The collaboration engine 120 may detect the presence of the unassociated device 304 on the LAN via network communications information on the associated device 104 (e.g., arp table, routing table, LAN communication between the two devices 104, 304). In some embodiments, the Wi-Fi router may be associated with the user 102B, thereby making other devices 304 on the LAN available as prospective associated devices 104.

In some embodiments, upon detection of a device 304 prospectively associated with the collaborative user 102B, the user 1029 may be prompted to confirm the association of the device 304, and may be prompted to install the local collaboration module 112 onto the device 304. As such, the unassociated device 304 is subsequently added to the pool 106 of associated devices 104 for the user 102B. The pool 106 of associated devices 104 may be stored as a part of the user profile 122 of the user 102B.

In some embodiments, the collaboration system 100 may track current usage associated with each device 304. In other words, the collaboration system 100 may determine what device(s) 304 the collaborative user 102B is currently using at any given time. In some embodiments, the local collaboration module 112 of an "in-use" device may transmit data to the collaboration engine 120 indicating that the device 304 is currently being used and how it is being used. In an example, collaboration system 100 requests permission from the user before transmitting or tracking device usage. For example, the local collaboration module 112 may determine that the device's 304 screen has been powered on (e.g., a smart phone or tablet which might normally have their screen deactivated when not in use), or may determine that user inputs are being performed on the device 304 (e.g., movement of the mouse, typing on a keyboard, touch input on a touch screen), or may determine that a particular application is actively being used (e.g., a media player is currently presenting a media content item). As such, the local collaboration module 112 may identify when the user 1029 is using a particular device 304. Such "in-use data" may be used by the collaboration engine 120 to reach the collaborative user 102B in a timely manner for a collaboration event.

In some embodiments, the collaboration engine 120 or various partner systems 320 may determine when the collaborative user 102B is using a particular device 304. For example, a social media network may detect a login event for an account of the collaborative user 102B, or a message post event by the user 102B (e.g., posting a photo or a text message), or a content access event by the user 102B (e.g., clicking on a link of another user's message). The detecting system determines which device 304 of the user 1029 that is being used to perform the use operations. The detecting system then transmits in-use data to the collaboration engine 120, identifying both the collaborative user 102B and the particular device 304 currently in use by that user 102B.

In some embodiments, the collaboration engine 120 may poll the various devices 104 of the collaborative user 102B to determine which device(s) 104 are actively being used by the user 102B. For example, upon initiation of a collaboration event, the collaboration engine 120 may poll each device 104 within the pool 106 of devices 104 associated with the collaborative user 102B to determine which, if any, of the devices 104 are currently being used by the user 102B. The collaboration engine 120 may then use any of those in-use devices 104 as prospective target devices for the collaboration event.

In some embodiments, the collaboration engine 120 may utilize location data of the user 102B to determine prospective target devices in which the user 102B may be in proximity. For example, the user 102B may tend to carry around their smart phone on their person. As such, the collaboration engine 120 may receive location data as to the location of the user 102B and may compare this location data to known location data of other devices 104 in the pool 106. For example, a home nest device, smart television, and desktop computer may be determined to be located at the primary residence of the user 1029 (e.g., via GPS data collected from those devices, or via inference based on the type of device, or based on concurrent use of those devices with the smart phone when the user 102B is at their residence). Accordingly, the collaboration engine 120 may determine that the user 102B is at their primary residence, and thereby may consider any of the devices 104 at that location as prospective target devices. In other words, and for example, one or more of those devices 104 may be considered "in use" because of the proximity to the known location of the user 1029 even if, for example, the user 102B has not recently interacted with the device 104.

In some embodiments, the collaboration system 100 may track usage history associated with each device 304. The usage history identifies when the collaborative user 102B has used each particular device 104. In some embodiments, the in-use data may be tracked over time, thereby making the stale in-use data usage history data. With the usage history for each of the devices 304, the collaboration system 100 may then generate a usage pattern associated with the user 102B's uses of each of the devices 104. The collaboration system 100 may use that usage pattern to determine when (e.g., a time of the day, a day of the week) the user 102B is likely to use a particular device 104. The usage pattern may then be used to determine, given a particular time, which device 104 of the pool 106 the user 102B is likely to use next. The target device, so determined, may be used to reach the collaborative user 102B in a timely manner during a collaboration event.

Figure 4:
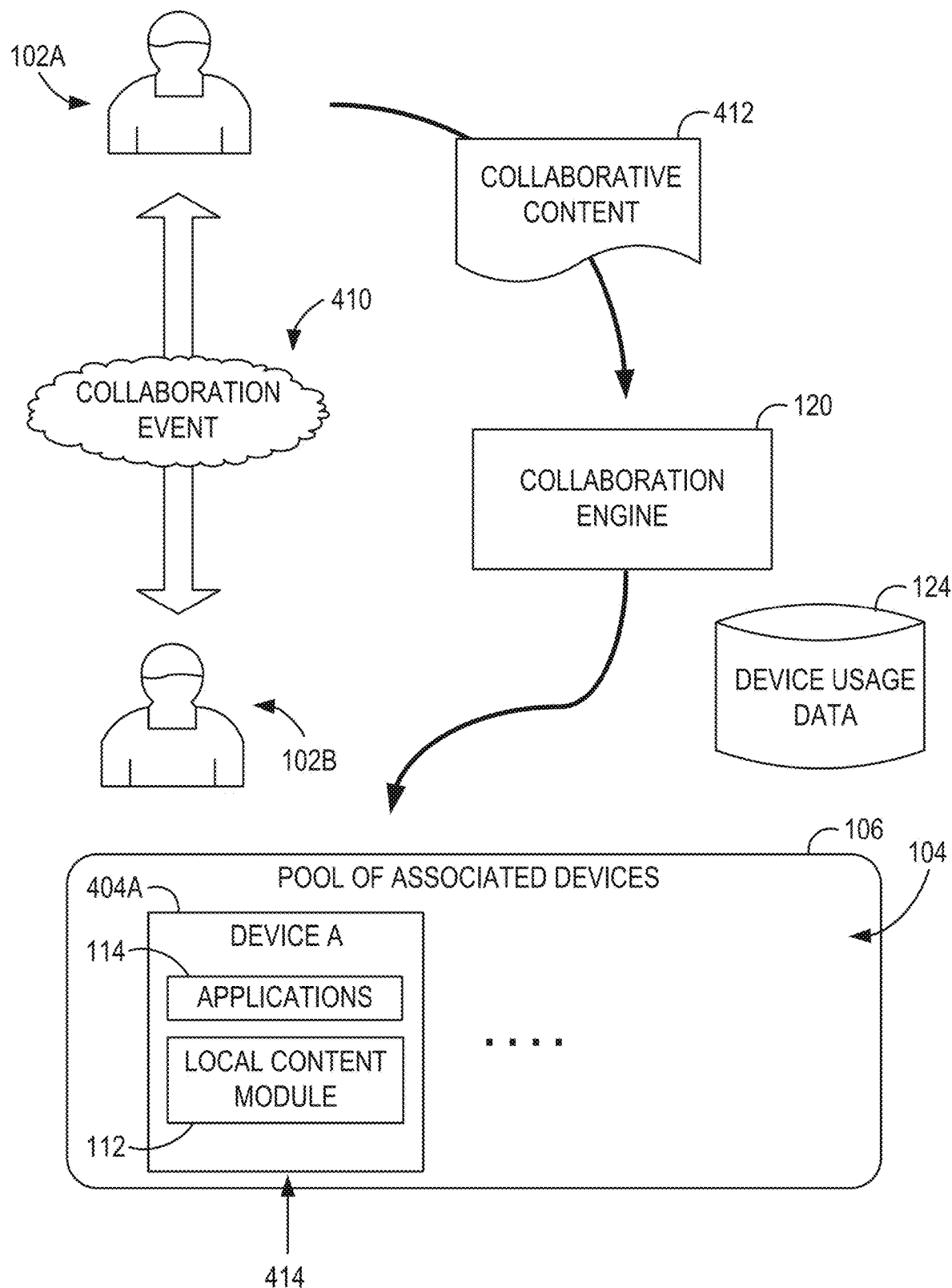
FIG. 4 is a workflow diagram depicting a collaboration event between the primary user and the collaborative user, and as facilitated by the collaboration system, according to some embodiments.

FIG. 4 is a workflow diagram depicting a collaboration event 410 between the primary user 102A and the collaborative user 102B, and as facilitated by the collaboration system 100, according to some embodiments. In an example embodiment, the primary user 102A is viewing a content item (e.g., collaborative content 412) that becomes the subject of the collaboration event 410. For example, the collaborative content 412 may be a document describing a prospective change impacting a retirement plan shared by the primary user 102A and their spouse (e.g., the collaborative user 102B).

In an example embodiment, the primary user 102A may be viewing the collaborative content 412 on a device 104 of their own. As the primary user 102A reviews the collaborative content 412, the primary user 102A, in this example, decides to initiate the collaboration event 410 with respect to the collaborative content 412. In response to the request to initiate the collaboration event 410, the collaboration engine 120 presents a user selection interface to the primary user 102A (e.g., via the local collaboration module 112 on the primary user 102A's device 104). The user selection interface allows the primary user 102A to identify with whom they want to collaborate. The collaboration engine 120 may maintain a list of collaborative users 102 with which the primary user 102A has previously collaborated (e.g., as a part of the user profile 122), and may present this list as options for collaboration.

In an example embodiment, the primary user 102A selects their spouse as the collaborative user 102B. The collaboration system 100 has previously identified the pool 106 of devices 104 as associated with the collaborative user 102B (e.g., as described above). At the time of the collaboration event 410, the collaborative user 102B may be using one of their devices, such as "device A" 404A. For example, device A 404A may be a laptop computer, and the collaborative user 102B may be at their work location and actively using the laptop computer to perform various work duties (e.g., reading emails, editing documents, using work-related applications 114, and so forth).

In an example embodiment, the collaboration engine 120 detects, from the pool 106 of devices 104 associated with the collaborative user 102B, which device(s) 104 are currently in use. The collaboration engine 120 may determine use based on a recent window of activity (e.g., devices 104 used within the last 10 minutes), or based on continuous use (e.g., regular input interaction events detected between the user 102 and the device 104). In this example, the collaboration engine 120 detects that device A 404A is currently in use by the collaborative user 102B and, as such, device A 404A is selected as the target device 414 for the collaboration event 410.

In some embodiments, the collaboration engine 120 may evaluate available device venues within the in-use device(s), and may limit the selection of the target device 414 based on the existence of a device venue within the prospective target devices capable of supporting collaboration with the collaborative content 412. For example, presume the collaborative user 102B is at home and is currently using, or has recently used, both their laptop (which supports a document viewer capable of presenting the collaborative content 412) and a nest device (which primarily provides only audio input/output). As such, the collaboration engine 120 may exclude the nest device as a prospective target device 414, even though it may be currently in use, because it is not configured to support this collaboration event 410.

In an example embodiment, the collaboration engine 120 transmits the collaborative content 412 to the target device 414. The local collaboration module 112 may allow the collaborative user 102B to review the collaborative content 412, or may execute an application 114 locally on the target device 414 to facilitate review of the collaborative content 412. In some embodiments, upon completion of their review, the collaborative user 102B may mark as complete their portion of the collaboration event 410. Upon completion, the local collaboration module 112 may transmit a completion message to the collaboration engine 120, and the collaboration engine 120 may transmit the completion message to the primary user 102A, thereby informing the primary user 102A of the completed review. In some embodiments, the completion message may include acceptance or rejection data related to the review, or additional notes, comments, or other user-provided content entered by the collaborative user 102W As such, the primary user 102A may be informed of the collaborative user 102B's disposition and input related to the collaboration event 410.

In some embodiments, and as mentioned above, the collaboration event 410 may be a part of a collaborative process in which the collaborative user 102B participates (e.g., optionally, necessarily). For example, the collaborative user 102B may be a joint member on a home loan application and, as such, their approvals may also be required at certain stages of the process, or they may need to execute certain documents as a part of the process. As such, the collaboration engine 120 or the local collaboration module 112 of the target device 414 may be configured to facilitate performance of the collaborative process by the collaborative user 102B as a part of the collaboration event 410.

For example, the collaborative content 412 may be a document to be executed by the collaborative user 102B, and the collaboration engine 120 may determine a target device 414 and target device venue supporting an application 114 allowing the collaborative user 102B to view and execute that document. After the user 102B receives and executes the document, the target device 414 transmits the executed document back to the collaboration engine 120, or an initiating device 104 of the primary user 102A, or to a content provider 130 or a third-party system 140, thereby completing the collaborative user 102B's portion of the collaborative process.

In some embodiments, the collaborative user 102B may not be actively using any of their devices 104. For example, the collaboration engine 120 may analyze the current or most recent window of device usage data 124 (e.g., the most recent 5 minutes, 10 minutes, or 30 minutes), and may determine that none of the devices 104 satisfy current or recent usage. In other words, the collaboration engine 120 does not determine a target device 414 after such analysis. As such, the collaboration engine 120 may then determine a target device 414 based on historical usage patterns of the devices 104 (e.g., frequency-based selection), as well as possibly the timing of the collaboration event 410 (e.g., timing-based selection).

For example, the collaboration engine 120 may analyze a pre-determined period of historical data (e.g., 3 months, or 12 months) to determine that the collaborative user 102B frequently uses their tablet during their morning and evening commutes on weekdays, and frequently uses their home desktop computer later in the evenings. In some embodiments, the collaboration engine 120 may select the tablet as the target device 414 because the tablet is used by the user 102B more frequently than the home desktop computer. In some embodiments, the collaboration engine 120 may select the tablet as the target device 414 if, for example, the collaboration event 410 occurs in the afternoon on a workday and the collaboration engine 120 determines that the next device the user 102B is most likely to use is the tablet (e.g., during their commute home). As such, the collaboration engine 120 uses historical device usage data 124 to determine a target device 414 on which the collaborative user 102B is more likely to get engaged with the collaboration event 410 earlier than the other devices 104.

In some embodiments, the collaboration event 410 may include verbal-based or video-based interaction with the collaborative user 102B. For example, the collaborative event 410 may request, or the primary user 102A may request, verbal interaction with, or verbal approval by, the collaborative user 102B. The collaboration engine 120 may determine a target device 414 supporting audio or video collaboration with the collaborative user 102B.

For example, some device 104 may be configured to present audio output (e.g., via a speaker) and receive audio input (e.g., via a microphone), such as a home nest device, or a smart phone, or a car audio system, or a home entertainment system (e.g., smart television, console gaming device). Some devices 104 may be configured to capture video input (e.g., via a digital camera) and display video output (e.g., via a display console, screen). As such, the collaboration engine 120 may determine one such device 104 currently used by, recently used by, or likely to be used soon by the collaborative user 102B as the target device 414.

The collaboration engine 120 may then initiate contact with the target device 414 and, for example, present audio-based or video-based collaborative content 412 to the collaborative user 102B, or open an audio-based or video-based interactive session between the collaborative user 102B and the primary user 102A, or another person (e.g., a salesperson, an advisor). As a part of the collaborative session, the collaboration engine 120 may also request and accept a verbal acceptance or denial of a particular query to the collaborative user 102B (e.g., a verbal approval to proceed with a transaction, or open an account in their name).

For example, the collaboration engine 120 may determine that the collaborative user 102B is currently riding in their car (e.g., via comparing GPS location data of their smart phone, which is typically carried on their person, with GPS location data of their automobile, or via near-field communication pairing between the smart phone of the user 102B and the automobile computer, or via automobile data indicating that the car is currently being operated), and the car includes audio output and input devices capable of providing an audio-based interaction session with the collaborative user 102B. As such, the collaboration engine 120 may establish a communications channel with the car and provide audio-based content presentation, or interaction, or query acceptance via the audio session, thereby allowing the user 102B to be informed as to the nature of the collaboration, facilitating discussion between the user 102B and the primary user 102A or other person, and receiving a verbal response for the collaboration query.

In one example embodiment, a financial advisor may initiate the collaboration event 410 with both the collaborative user 102B and the primary user 102A (e.g., as another collaborative user 102B). For example, the financial advisor may have generated a proposed change in the retirement portfolio of the couple (e.g., a change in goals, retirement age, investment portfolio disposition, house or savings, and so forth). Before acting on the proposed change, the financial advisor may wish to interact with both of the spouses to, for example, explain the nature of the proposal, or request approval from each of the spouses. As such, the collaboration engine 120 may then initiate collaboration session(s) with each of the collaborative users 1029, either together or separately. More specifically, the collaboration engine 120 determines a target device 414 for each of the collaborative users 102B and, for whichever are able to be reached, initiates the collaboration session with those collaborative users 102B. The advisor may then explain the collaborative content 412 to the users 102B, address any questions presented by the users 102B, make any changes to the proposal, and receive acceptance or denial of the proposal from each of the users 102B.

Figure 5:
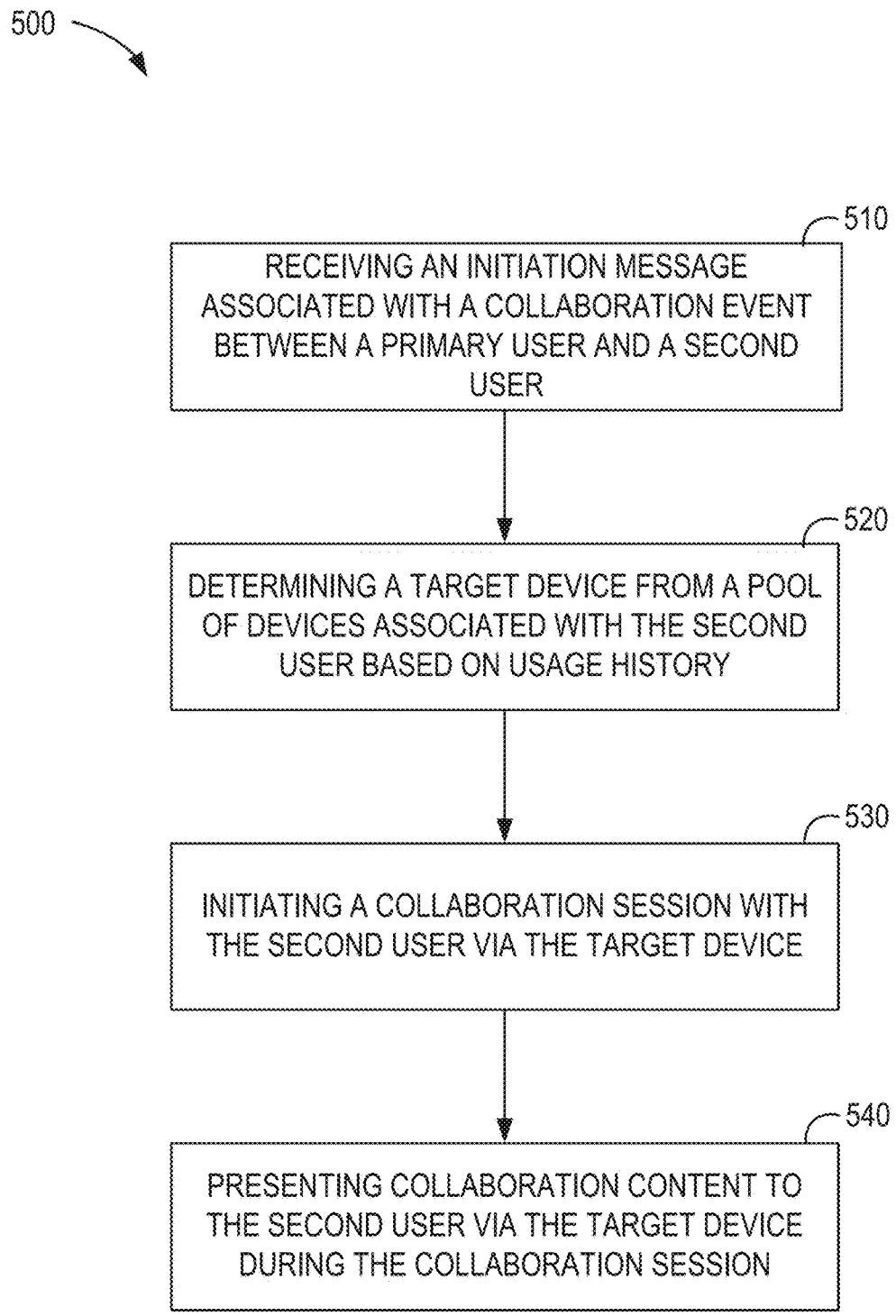
FIG. 5 illustrates an example computer-implemented method for facilitating collaboration between users, according to some embodiments.

FIG. 5 illustrates an example computer-implemented method 500 for facilitating collaboration between users 102, according to some embodiments. The computer-implemented method 500, hereafter referred to as "the method 500," is performed by a computing device comprising at least one hardware processor and a memory. In an example embodiment, the method 500 includes receiving an initiation message associated with a collaboration event between a first user and a second user, the collaboration event initiated by the first user (see operation 510).

In an example embodiment, the method 500 also includes determining a target device from a pool of computing devices associated with the second user based on usage history of each computing device in the pool of computing devices (see operation 520). In some embodiments, determining a target device from the pool of computing devices associated with the second user further includes determining the target device as a device used by the second user within a pre-determined period of time.

In an example embodiment, the method 500 further includes initiating a collaboration session with the second user via the target device (see operation 530). In some embodiments, initiating a collaboration session with the second user further includes establishing a communications channel with the target device, wherein presenting collaborative content further includes transmitting audio or video collaborative content over the communications channel to the target device for presentation to the second user.

In an example embodiment, the method 500 also includes presenting collaborative content to the second user via the target device during the collaboration session (see operation 540). In some embodiments, presenting the collaborative content includes transmitting the collaborative content to the target device, the target device includes a target device venue configured to present the collaborative content, the collaborative content is presented to the second user using the target device venue. In some embodiments, presenting collaborative content further includes transmitting an audio-based query to the user for acceptance or rejection, and the method 500 further includes receiving audio data from the second user in response to the audio-based query, and determining, using audio analysis of the audio data, that the second user has accepted the audio-based query.

In some embodiments, the method 500 further includes, prior to determining the target device, detecting an association between the second user and the target device, and in response to said detecting an association, adding the target computing device to the pool of computing devices associated with the second user. In some embodiments, the method 500 also includes providing the first user with a plurality of prospective collaborative users, and receiving, from the first user, a selection of the second user as participating in the collaboration event.

Figure 6:
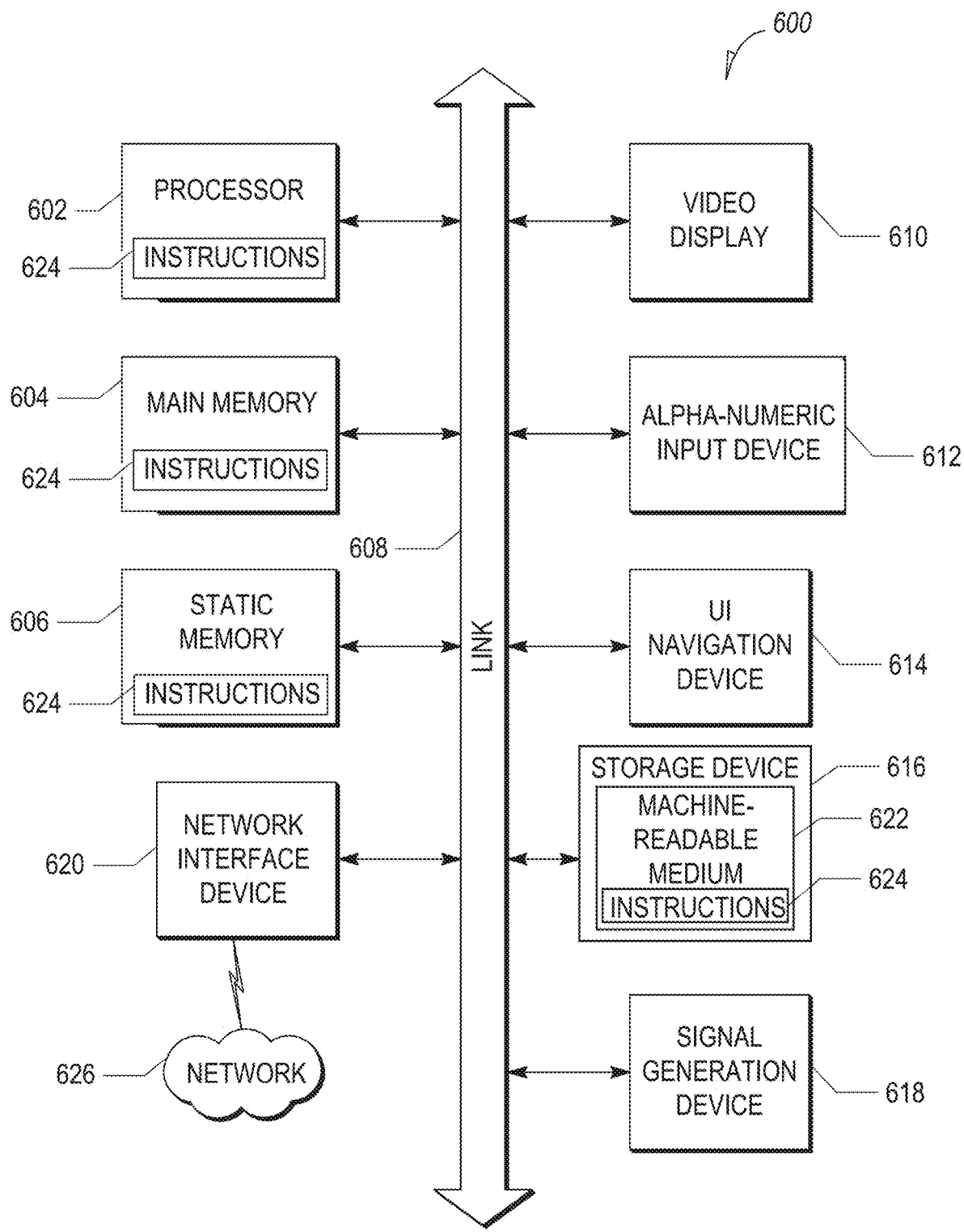
FIG. 6 is a block diagram illustrating a machine in the example form of a computer system, within which a set or sequence of instructions can be executed to cause the machine to perform any one of the methodologies discussed herein, according to some embodiments.

FIG. 6 is a block diagram illustrating a machine in the example form of a computer system 600, within which a set or sequence of instructions can be executed to cause the machine to perform any one of the methodologies discussed herein, according to some embodiments. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 can further include a video display unit 610, an alphanumeric input device 612 (e.g., a keyboard), and a user interface (UI) navigation device 614 (e.g., a mouse). In one embodiment, the video display unit 610, alphanumeric input device 612, and UI navigation device 614 are incorporated into a touch-screen display. The computer system 600 can additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g.; software) embodying or utilized by any one or more of the methodologies or functions described herein. The instructions 624 can also reside, completely or at least partially, within the main memory 604, within the static memory 606, and/or within the processor 602 during execution thereof by the computer system 600, with the main memory 604, static memory 606, and the processor 602 also constituting machine-readable media 622.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure or that is capable of storing, encoding, or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:
1. A method comprising:
  receiving an initiation message associated with a collaboration event between a first user and a second user; the collaboration event initiated by a computing device with the first user and associated with collaborative content, and the collaborative content including a document;
  determining a target device from a pool of computing devices associated with the second user to complete a collaborative step of the collaboration event based on:
    usage history of each computing device in the pool of computing devices;
    capabilities of each computer device in the pool of computing devices to present the collaborative content and capabilities to complete the collaborative step of the collaboration event, the collaborative step including digitally signing the document; and
    whether an application for completing the collaborative step is installed on the target device;
  initiating a collaboration session with the second user via the target device to complete the collaborative step of the collaboration event; and
  presenting the collaborative content to the second user via the target device during the collaboration session to perform the collaborative step on the target device.

2. The method of claim 1, wherein the document includes a portion highlighted by the first user and wherein a second collaborative step is review of the highlighted portion by the second user.

3. The method of claim 1, further comprising:
automatically determining that the second user is required for the collaboration event.

4. The method of claim 1, wherein presenting the collaborative content to the second user via the target device includes initiating the application on the target device.

5. The method of claim 1, wherein a second collaborative step is approval, by the second user, of a recommendation made by a third-party.

6. The method of claim 1, wherein:
initiating the collaboration session with the second user includes establishing a communications channel with the target device; and
presenting collaborative content further includes transmitting audio or video collaborative content over the communications channel to the target device for presentation to the second user.

7. The method of claim 1, wherein initiating the collaboration session with the second user includes transmitting a message to a social media account of the second user.

8. A non-transitory computer-readable medium comprising instructions, which when executed by at least one processor, cause the at least one processor to perform operations comprising:
receiving an initiation message associated with a collaboration event between a first user and a second user, the collaboration event initiated by a computing device with the first user and associated with collaborative content, and the collaborative content including a document;
determining a target device from a pool of computing devices associated with the second user to complete a collaborative step of the collaboration event based on:
usage history of each computing device in the pool of computing devices;
capabilities of each computer device in the pool of computing devices to present the collaborative content and capabilities to complete the collaborative step of the collaboration event, the collaborative step including digitally signing the document; and
whether an application for completing the collaborative step is installed on the target device;
initiating a collaboration session with the second user via the target device to complete the collaborative step of the collaboration event; and
presenting the collaborative content to the second user via the target device during the collaboration session to perform the collaborative step on the target device.

9. The non-transitory computer-readable medium of claim 8, wherein the document includes a portion highlighted by the first user and wherein a second collaborative step is review of the highlighted portion by the second user.

10. The non-transitory computer-readable medium of claim 8, wherein the operations further include:
automatically determining that the second user is required for the collaboration event.

11. The non-transitory computer-readable medium of claim 8, wherein presenting the collaborative content to the second user via the target device initiating the application on the target device.

12. The non-transitory computer-readable medium of claim 8, wherein a second collaborative step is approval, by the second user, of a recommendation made by a third-party.

13. The non-transitory computer-readable medium of claim 8, wherein:
initiating the collaboration session with the second user includes establishing a communications channel with the target device; and
presenting collaborative content further includes transmitting audio or video collaborative content over the communications channel to the target device for presentation to the second user.

14. The non-transitory computer-readable medium of claim 8, wherein initiating the collaboration session with the second user includes transmitting a message to a social media account of the second user.

15. A system comprising:
at least one processor;
a storage device comprising instructions, which when executed by the at least one processor, configure the at least one processor to perform operations comprising:
receiving an initiation message associated with a collaboration event between a first user and a second user, the collaboration event initiated by a computing device with the first user and associated with collaborative content, and the collaborative content including a document;
determining a target device from a pool of computing devices associated with the second user to complete a collaborative step of the collaboration event based on:
usage history of each computing device in the pool of computing devices;
capabilities of each computer device in the pool of computing devices to present the collaborative content and capabilities to complete the collaborative step of the collaboration event, the collaborative step including digitally signing the document; and
whether an application for completing the collaborative step is installed on the target device;
initiating a collaboration session with the second user via the target device to complete the collaborative step of the collaboration event; and
presenting the collaborative content to the second user via the target device during the collaboration session to perform the collaborative step on the target device.

\* \* \* \* \*

UNITED STATES PATENT AND TRADEMARK OFFICE
CERTIFICATE OF CORRECTION

PATENT NO. : 11,240,316 B1
APPLICATION NO. : 16/948905
DATED : February 1, 2022
INVENTOR(S) : Gracey et al.

It is certified that error appears in the above-identified patent and that said Letters Patent is hereby corrected as shown below:

In the Claims

In Column 16, Line 45, in Claim 1, delete "user;" and insert --user,-- therefor

Signed and Sealed this
Fourteenth Day of June, 2022

*Katherine Kelly Vidal*

Katherine Kelly Vidal
*Director of the United States Patent and Trademark Office*